(12) United States Patent
Mikami (10) Patent No.: US 7,538,483 B2
(45) Date of Patent: May 26, 2009

(54) INORGANIC ELECTROLUMINESCENT DEVICE AND METHOD OF FABRICATING THE SAME

(75) Inventor: Akiyoshi Mikami, Kanazawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 628 days.

(21) Appl. No.: 10/635,777

(22) Filed: Aug. 7, 2003

(65) Prior Publication Data

US 2004/0032203 A1 Feb. 19, 2004

(30) Foreign Application Priority Data

Aug. 7, 2002 (JP) ............................. 2002-230311

(51) Int. Cl.
*H01J 1/62* (2006.01)
*H01J 63/04* (2006.01)

(52) U.S. Cl. .................. 313/502; 428/690; 428/917

(58) Field of Classification Search ................ 428/690, 428/917; 313/502, 503, 504, 509; 252/301.45; 257/102
See application file for complete search history.

(56) References Cited

U.S. PATENT DOCUMENTS

| 4,717,858 | A |   | 1/1988 | Tanaka et al. |         |
|-----------|---|---|--------|---------------|---------|
| 4,720,436 | A | * | 1/1988 | Ohseto et al. | 428/690 |
| 4,727,004 | A | * | 2/1988 | Tanaka et al. | 428/690 |
| 5,700,591 | A | * | 12/1997| Okajima et al.| 428/690 |
| 6,699,596 | B2| * | 3/2004 | Yano et al.   | 428/690 |

FOREIGN PATENT DOCUMENTS

| EP | 0 249 942  |   | 12/1987 |
|----|------------|---|---------|
| JP | 62-12093   |   | 1/1987  |
| JP | 62-122096  |   | 6/1987  |
| JP | 62-225583  |   | 10/1987 |
| JP | 63-995     |   | 1/1988  |
| JP | 64-027194  | * | 1/1989  |
| JP | 01-243391  |   | 9/1989  |
| JP | 02-148595  |   | 6/1990  |
| JP | 3-266393   |   | 11/1991 |

(Continued)

OTHER PUBLICATIONS

Red Electroluminescence from MgS:Eu and $Mg_{1-x}Ca_x$ S:Eu Thin Film Phosphors preapred by RF-Sputtering Technique, Akiyoshi Mikami et al. Ishikawa, Japan, pp. 1-3.

(Continued)

*Primary Examiner*—D. Lawrence Tarazano
*Assistant Examiner*—Camie S Thompson
(74) *Attorney, Agent, or Firm*—McDermott Will & Emery LLP (57) ABSTRACT

A transparent electrode composed of ITO(indium-tin oxide), an insulating layer composed of ZrSiN, an underlayer composed of MgS with a thickness of 100 to 300 nm, a light emitting layer composed of $Mg_{1-x}Ca_xS$, and an insulating layer composed of ZrSiN are formed in this order on a glass substrate. Electrodes composed of Al are formed on the insulating layer. The underlayer is formed by sputtering with the substrate temperature set to room temperature. The light emitting layer is formed by sputtering with the substrate temperature set to not lower than 100° C.

2 Claims, 8 Drawing Sheets

FOREIGN PATENT DOCUMENTS

| JP | 04-094094 | 3/1992 |
| JP | 08-069881 | 3/1996 |
| JP | 2001-118677 | 4/2001 |

OTHER PUBLICATIONS

Fabrication of MgS:Eu reddish orange emitting electroluminescent device by rf-sputtering technique, The 49th Meeting, Mar. 2002 of The Japan Society of Applied Physics, (with Translation).

Notice for Reasons for Refusals issued in corresponding Japanese Patent Application No. 2002-230311, dated on Aug. 21, 2007.

Mikami et al "Chemical Vapor Deposition of ZnS: Mn Electroluminescent Films in a Low-Pressure Halogen Transport System" Journal of Chrystal Growht 110 (1991) pp. 381-394 Elseiver Science Publishers B.V. North Holland.

* cited by examiner

INORGANIC ELECTROLUMINESCENT DEVICE AND METHOD OF FABRICATING THE SAME

BACKGROUND OF THE INVENTION

1. Field of the Invention

The present invention relates to an inorganic electroluminescent device and a method of fabricating the same.

2. Description of the Background Art

Conventionally, inorganic electroluminescent devices (hereinafter abbreviated to inorganic EL devices) have drawn attention as flat light emitting type devices. In an inorganic EL device, a high electric field is applied to a light emitting layer made of an inorganic material so as to cause electrons to accelerate. in this electric field and collide with a luminescent center, so that the luminescent center is excited to emit light.

In particular, inorganic EL devices having a light emitting layer principally composed of an alkaline earth sulfide and doped with Eu(europium) provide red light emission with high color purity. Therefore they have conventionally been regarded as components of great prospects.

JP 64-27194 A, for example, describes an inorganic EL device employing a mixed crystal of CaS(calcium sulfide) and MgS(magnesium sulfide) as a material of a light emitting layer. In the inorganic EL device, a transparent electrode, a first insulator layer composed of $Ta_2O_5$, a light emitting layer composed of $Mg_{0.4}Ca_{0.6}S$:Eu, a second insulator layer composed of $Al_2O_3$, and an upper electrode are formed on a glass substrate in this order.

The aforementioned publication describes that the inorganic EL device disclosed therein can provide improved luminance and efficiency while maintaining high color purity, through the use of the mixed crystal of CaS and MgS as a material of the light emitting layer.

In the conventional inorganic EL device, however, further improving crystallinity and optical characteristics of the light emitting layer requires MgCaS to be formed at increased temperatures. However, increasing the temperature actually degrades crystallinity and therefore deteriorates optical characteristics. For this reason, an inorganic EL device having sufficiently good luminous characteristics has not been realized.

SUMMARY OF THE INVENTION

An object of the present invention is to provide an inorganic electroluminescent device having good luminous characteristics and a method of fabricating the same.

An inorganic electroluminescent device according to one aspect of the present invention comprises in the following order; an underlayer formed of a first compound semiconductor of Group IIa-VIb; and a light emitting layer formed of a second compound semiconductor of Group IIa-VIb, wherein the first compound semiconductor and the second compound semiconductor have the same crystalline structure.

In the inorganic electroluminescent device according to this invention, on the underlayer formed of the first compound semiconductor of Group IIa-VIb, the light emitting layer formed of the second compound semiconductor of Group IIa-VIb having the same crystalline structure as that of the first compound semiconductor is provided. This allows the crystallinity of the light emitting layer to be improved when the light emitting layer is formed at an increased temperature so that the good optical characteristics can be obtained. As a result, an inorganic electroluminescent device having good luminous characteristics can be realized.

The second compound semiconductor is preferably doped with a substance acting as a luminescent center. The underlayer and the light emitting layer may be provided between a first electrode and a second electrode. Moreover, the inorganic EL device preferably comprises the underlayer and the light emitting layer on a substrate in this order.

The underlayer may be doped with a substance acting as a luminescent center. In this case, the underlayer as well as the light emitting layer is allowed to emit light.

Preferably, the first compound semiconductor and the second compound semiconductor have a rock-salt structure. In this case, on the underlayer having a rock-salt structure, the light emitting layer having the same rock-salt structure is provided, whereby the crystallinity of the light emitting layer is further improved when the light emitting layer is formed at an increased temperature.

The first compound semiconductor and the second compound semiconductor may have an orientation in an <100> direction. This allows the crystallinity of the light emitting layer to be improved to achieve good optical characteristics.

The bandgap of the first compound semiconductor may be larger than the bandgap of the second compound semiconductor. In this case, the light emitted from the light emitting layer formed of the second compound semiconductor is taken out transmitting through the underlayer composed of the first compound semiconductor without being absorbed by the underlayer. Consequently, a sufficiently high luminance is achieved.

The inorganic EL device may comprise the first electrode, the underlayer, the light emitting layer and the second electrode on the substrate in this order, wherein the substrate and the first electrode are preferably formed of optically transparent materials that can transmit the light emitted from the light emitting layer.

In this case, the light emitted from the light emitting layer is sufficiently taken out transmitting through the first electrode and the substrate. Consequently, a sufficiently high luminance is achieved.

The first compound semiconductor may contain magnesium and sulfur, and the second compound semiconductor may contain magnesium and sulfur.

In this case, the light emitting layer containing magnesium and sulfur is formed on the underlayer containing magnesium and sulfur, whereby the underlayer acts to prevent lack of sulfur in the light emitting layer during formation of the light emitting layer at an increased temperature. This allows the crystallinity of the light emitting layer to be improved to achieve good optical characteristics.

The second compound semiconductor may further comprise calcium. In this case, the second compound semiconductor contains calcium in addition to magnesium and sulfur, thereby achieving red color light emission with high color purity.

The second compound semiconductor may contain $Mg_{1-x}Ca_xS$, wherein the Ca composition ratio x may be $0.1 \leq x \leq 0.15$. This enables red color light emission with high color purity corresponding to the red color of a CRT(cathrode-ray tube).

Preferably, the thickness of the underlayer is not larger than 500 nm. Consequently, it becomes possible to lower emission initiation voltage while maintaing high luminous intensity. Accordingly, power consumption can be reduced.

More preferably, the thickness of the underlayer is not larger than 200 nm. In this case, it becomes possible to further lower the emission initiation voltage while maintaining high luminous intensity. Accordingly, power consumption can be further reduced.

The thickness of the light emitting layer is preferably larger than the thickness of the underlayer. This provides a high luminous intensity. Also, light absorption at the underlayer is suppressed.

The light emitting layer may contain a rare earth element or a transition metal element as a substance acting as the luminescent center. In particular, the substance acting as the luminescent center may be an element selected from the group consisting of europium, cerium and manganese. This provides a high luminous intensity.

The second compound semiconductor may contain $Mg_{1-x}Ca_xS$. Eu may be doped into $Mg_{1-x}Ca_xS$ as a substance acting as the luminescent center, and the Eu composition ratio to Mg may be not larger than 0.1. Consequently, the deterioration of the crystallinity of $Mg_{1-x}Ca_xS$ due to doping of Eu is sufficiently suppressed, so that the degradation of luminous efficiency is prevented.

The Eu composition ratio to Mg is preferably not larger than 0.01. Consequently, the deterioration of the crystallinity of $Mg_{1-x}Ca_xS$ due to doping of Eu is sufficiently suppressed, so that a high luminous intensity can be achieved.

A method of fabricating an inorganic electroluminescent device according to another aspect of the present invention comprises the steps of: forming an underlayer principally composed of a first compound semiconductor of Group IIa-VIb; and forming on the underlayer a light emitting layer principally composed of a second compound semiconductor of Group IIa-VIb having the same crystalline structure as that of the first compound semiconductor of Group IIa-VIb and doped with a substance acting as a luminescent center.

According to the method of this invention, on the underlayer principally composed of the first compound semiconductor of Group IIa-VIb, the light emitting layer principally composed of the second compound semiconductor of Group IIa-VIb having the same crystalline structure as that of the first compound semiconductor is formed, whereby the crystalline of the light emitting layer is improved, so that good optical characteristics are achieved. As a result, an inorganic electroluminescent device having good luminous characteristics can be fabricated.

The step of fabricating a underlayer preferably comprises a step of forming the underlayer at a first temperature, and the step of fabricating a light emitting layer preferably comprises a step of forming the light emitting layer at a second temperature higher than the first temperature. In this case, the underlayer acts to prevent lack of an element in the light emitting layer during formation of the light emitting layer at an increased temperature. This allows the crystallinity of the light emitting layer to be improved to achieve further improved optical characteristics.

Preferably, the first temperature is not higher than 100° C., and the second temperature is higher than 100° C. In this case, forming the underlayer at the first temperature not higher than 100° C. can sufficiently prevent lack of an element in the underlayer. Further, the underlayer acts to prevent lack of an element in the light emitting layer when the underlayer is formed at a temperature higher than 100° C. This allows the crystallinity of the light emitting layer to be sufficiently improved to achieve further improved optical characteristics.

In particular, the first temperature is preferably not lower than 20° C. nor higher than 70° C. This allows the crystallinity of the light emitting layer to be sufficiently improved to achieve further improved optical characteristics.

The second temperature is preferably not lower than 150° C. nor higher than 350° C. This allows the crystallinity of the light emitting layer to be further improved to achieve further improved optical characteristics. As a result, a high luminous intensity can be achieved.

The first compound semiconductor may contain magnesium and sulfur, and the second compound semiconductor may contain magnesium and sulfur.

In this case, the light emitting layer containing magnesium and sulfur is formed on the underlayer containing magnesium and sulfur, whereby the underlayer acts to prevent lack of sulfur during formation of the light emitting layer at an increased temperature. This allows the crystallinity of the light emitting layer to be improved to achieve good optical characteristics.

The second compound semiconductor may further contain calcium. In this case, the second compound semiconductor contains calcium in addition to magnesium and sulfur, thereby achieving red light emission with high color purity.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description will now be made of an inorganic electroluminescent device (hereinafter abbreviated to an inorganic EL device) according to one embodiment of the present invention.

Figure 1:
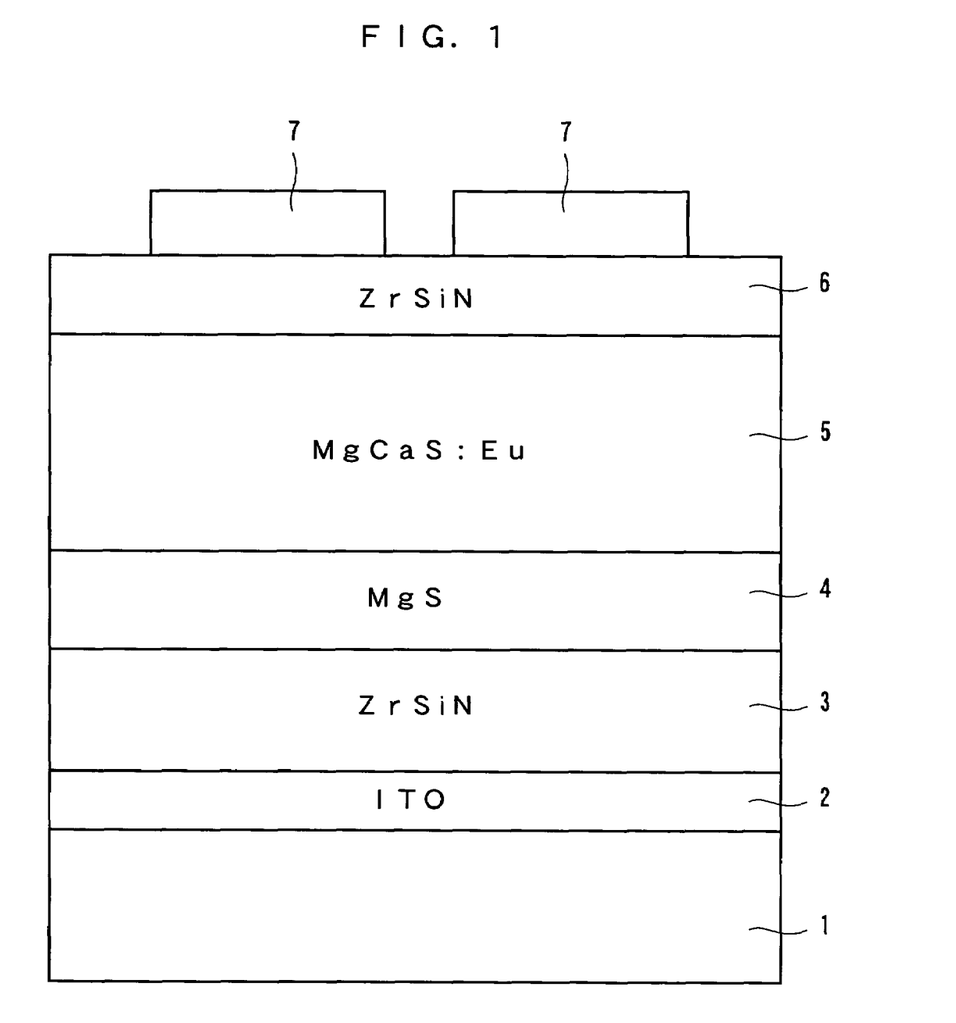
FIG. 1 is a schematic cross-sectional view showing the structure of an inorganic EL device according to one embodiment of the present invention.

FIG. 1 is a schematic cross-sectional view showing the structure of an inorganic EL device according to one embodiment of the invention.

In FIG. 1, a transparent electrode 2 composed of ITO (indium-tin oxide) with a thickness of 150 nm, a transparent insulating layer 3 composed of ZrSiN with a thickness of 100 to 300 nm, an underlayer 4 composed of MgS with a thickness of 100 to 300 nm, a light emitting layer 5 composed of $Mg_{1-x}Ca_xS$ with a thickness of 500 to 1000 nm, and an insulating layer 6 composed of ZrSiN with a thickness of 100 to 300 nm are formed on a glass substrate in this order. Electrodes 7 composed of Al with a thickness of not larger than 300 nm are formed on the insulating layer 6. While the description above has shown preferred examples of materials and thicknesses of respective layers, they are not exclusive in this invention.

The light emitting layer 5 is doped with Eu(europium) as a substance acting as a luminescent center. The Ca composition ratio x of $Mg_{1-x}Ca_xS$ in the light emitting layer 5 is preferably not smaller than 0 nor larger than 0.5. As will be described later, in order to obtain red light emission with high color purity at high efficiency, the Ca composition ratio x of $Mg_{1-x}Ca_xS$ in the light emitting layer 5 is more preferably $0.1 \leq x \leq 0.15$.

Description is next made of a method of fabricating the inorganic EL device of FIG. 1. First, a transparent electrode 2 composed of ITO is formed on a glass substrate 1 by sputtering, and an insulating layer 3 composed of ZrSiN is formed on the transparent electrode 2 by sputtering. An underlayer 4 composed of MgS is formed on the insulating layer 3 by sputtering with the substrate temperature kept at room temperature without being heated. A light emitting layer 5 composed of $Mg_{1-x}Ca_xS$ doped with Eu is then formed on the underlayer 4 by sputtering with the substrate temperature set to higher than 100° C. Further, an insulating layer 6 composed of ZrSiN is formed on the light emitting layer 5 by sputtering. Finally, electrodes 7 composed of Al are formed on the insulating layer 6 by vacuum vapor deposition.

During formation of the underlayer 4, the substrate temperature is in the range of room temperature(approximately 20° C.) to approximately 100° C., because of discharging of sputtering gas.

The "substrate temperature" herein represents temperature at which the substrate is maintained during film formation.

The insulating layer 3, the underlayer 4, the light emitting layer 5 and the insulating layer 6 are fabricated, for example, by radio frequency magnetron sputtering apparatus. The Table 1 shows the representative sputtering conditions.

TABLE 1

|  | insulating layer 3, 6 | under layer 4 | light emitting layer 5 |
|---|---|---|---|
| target material | Si + Zr | MgS | MgS + CaS + EuS |
| sputtering gas | $N_2$ | Ar | Ar |
| gas pressure [Pa] | 0.4 | 0.4 | 0.4 |
| RF power [W/cm$^2$] | 1.5 | 1.5 | 2.0 |
| substrate temperature | 200 | room temperature | 100~400 |

In the inorganic EL device according to this embodiment, MgS of the underlayer 4 and $Mg_{1-x}Ca_xS$ of the light emitting layer 5 have the same rock-salt structure. This allows the crystallinity of the light emitting layer 5 on the underlayer 4 to be further improved, as will be described later, when the light emitting layer 5 is formed at an increased temperature.

In addition, the bandgap of the underlayer 4 is larger than the bandgap of the light emitting layer 5. Consequently, light emitted from the light emitting layer 5 is taken out transmitting through the underlayer 4, the insulating layer 3, the transparent electrode 2 and the glass substrate 1, without being absorbed by the underlayer 4. Accordingly, a high luminance can be achieved.

Here, $Mg_{1-x}Ca_xS$ films were formed on substrates at various substrate temperatures by sputtering under the same conditions shown in Table 1 except the substrate temperature, and then the substrate temperature dependency of X-ray diffraction pattern was measured. At the same time, $Mg_{1-x}Ca_xS$ films and MgS films were formed in this order on substrates at various substrate temperatures, and the substrate temperature dependency of X-ray diffraction pattern was measured.

Figure 2:
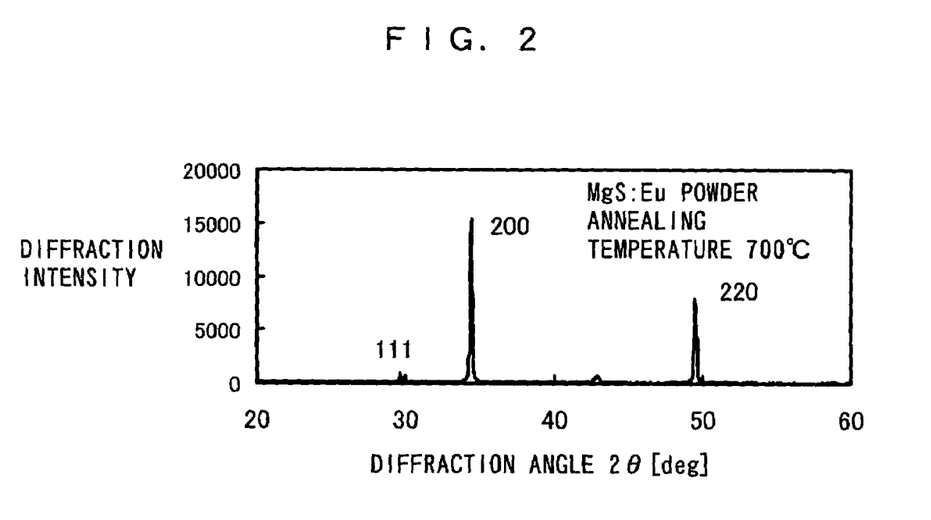
FIG. 2 is a diagram showing the result of measurement of the X-ray diffraction pattern of MgS powder doped with Eu.
Figure 3:
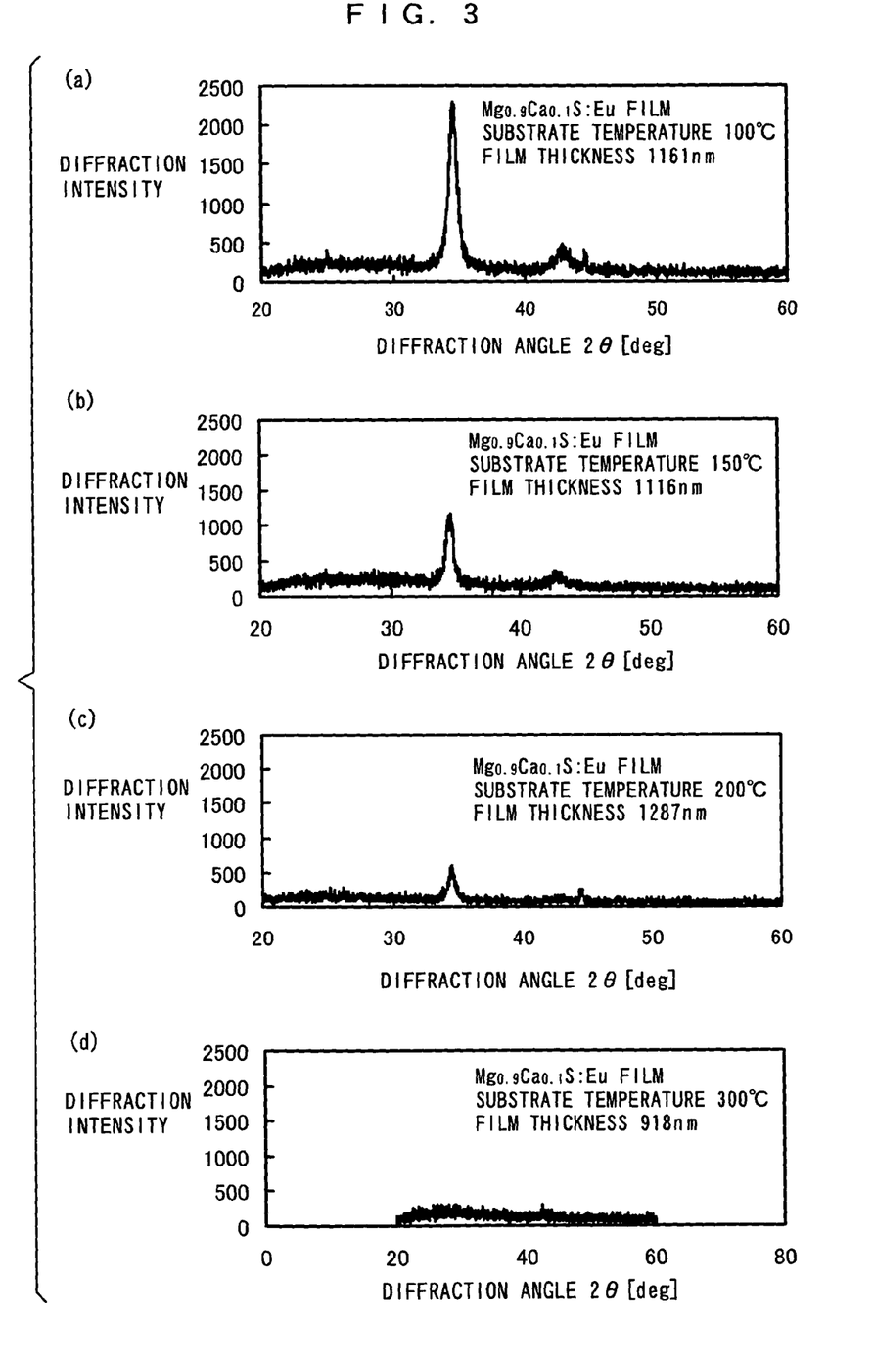
FIG. 3 is a diagram showing the result of measurement of the substrate temperature dependency of X-ray diffraction pattern of a $Mg_{0.9}Ca_{0.1}S$ film in the case where the $Mg_{0.9}Ca_{0.1}S$ film was formed on a substrate without a MgS film.
Figure 4:
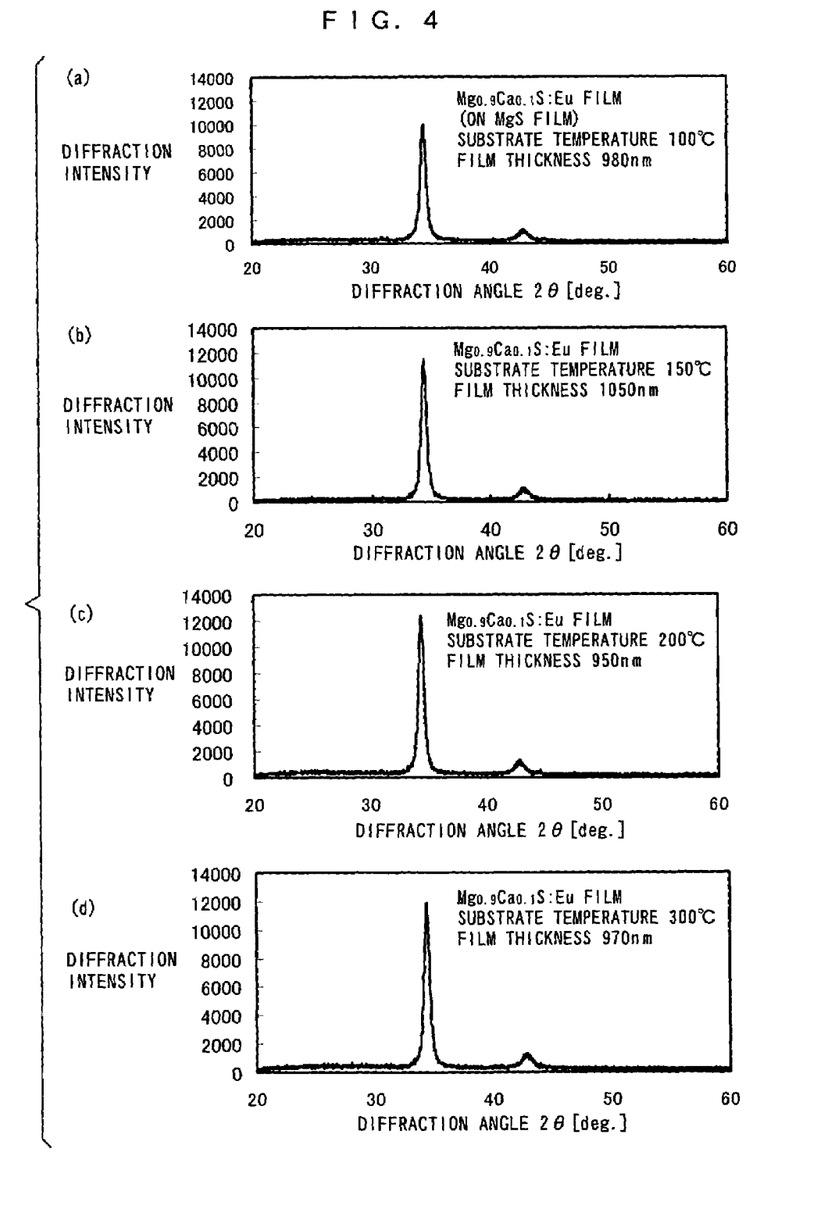
FIG. 4 is a diagram showing the result of measurement of the substrate temperature dependency of X-ray diffraction pattern of a $Mg_{0.9}Ca_{0.1}S$ film in the case where the $Mg_{0.9}Ca_{0.1}S$ film was formed on a substrate with a MgS film sandwiched therebetween.

FIG. 2 is a diagram showing the result of measurement of the X-ray diffraction pattern of polycrystal MgS powder doped with Eu and annealed at 700° C. Further, FIG. 3 is a diagram showing the result of measurement of the substrate temperature dependency of X-ray diffraction pattern of a $Mg_{0.9}Ca_{0.1}S$ film in the case where the $Mg_{0.9}Ca_{0.1}S$ film was formed without a MgS film on a substrate by sputtering, and (a), (b), (c), and (d) show the cases at substrate temperatures of 100° C., 150° C., 200° C., and 300° C. respectively. FIG. 4 is a diagram showing the result of measurement of the substrate temperature dependency of X-ray diffraction pattern of a $Mg_{0.9}Ca_{0.1}S$ film in the case where the $Mg_{0.9}Ca_{0.1}S$ film was formed on a substrate with a MgS film sandwiched therebetween by sputtering, and (a), (b), (c), and (d) show the cases at substrate temperatures of 100° C., 150° C., 200° C., and 300° C. respectively.

In FIG. 3, the thicknesses of the $Mg_{0.9}Ca_{0.1}S$ films of (a), (b), (c), and (d) are 1161 nm, 1116 nm, 1287 nm, and 918 nm respectively. Further, in FIG. 4, the thicknesses of the $Mg_{0.9}Ca_{0.1}S$ films of (a), (b), (c), and (d) are 980 nm, 1050 nm, 950 nm, and 970 nm, respectively.

As shown in FIG. 2, as to the MgS powder annealed at 700° C., there appear the diffraction peaks derived from the (200) plane, (111)plane and (220) plane while the diffraction peak derived from the (200) plane equivalent to the (100) plane remarkably appears.

As shown in FIGS. 3 and 4, also as to the $Mg_{0.9}Ca_{0.1}S$ films, there appears the remarkable diffraction peak derived from the (200) plane equivalent to the (100) plane, that is, the $Mg_{0.9}Ca_{0.1}S$ films have an orientation in a <100> direction. In the case of FIG. 3(d), however, there appears no diffraction peak.

As shown in FIG. 3(a)-(d), in the cases where the $Mg_{0.9}Ca_{0.1}S$ films were formed without the MgS films, the intensity of diffraction peak derived from the (200) plane is decreased as the substrate temperature is increased. Thus, it is found that the crystallinity of a $Mg_{0.9}Ca_{0.1}S$ film is deteriorated with an increasing substrate temperature.

This is probably because increasing the substrate temperature in an effort to improve the crystallinity of the $Mg_{0.9}Ca_{0.1}S$ film causes lack of S in the $Mg_{0.9}Ca_{0.1}S$ film, thereby degrading the crystallinity of the film.

In contrast, as shown in FIG. 4(a)-(d), in the cases where the $Mg_{0.9}Ca_{0.1}S$ films were formed on the substrates with the MgS films sandwiched therebetween, the diffraction intensity becomes higher at each substrate temperature than each case where there is no underlayer as shown in FIG. 3(a)-(d). Further, the intensity of diffraction peak derived from the (200) plane is not decreased even when the substrate temperature is increased, and the intensity of diffraction peak becomes higher at a substrate temperature of 150° C. than at a substrate temperature of 100° C., and becomes even higher at substrate temperatures of 200° C. and 300° C. Therefore, it is found that when the MgS film is formed as an underlayer, the crystallinity of the $Mg_{0.9}Ca_{0.1}S$ film is further improved than when there is no underlayer, and the crystallinity of the $Mg_{0.9}Ca_{0.1}S$ film is still further improved by setting the substrate temperature higher than 100° C. during film formation.

This is probably because the MgS film acting as an underlayer acts to suppress lack of S in the $Mg_{0.9}Ca_{0.1}S$ film, thereby forming the $Mg_{0.9}Ca_{0.1}S$ film so as to have high crystallinity at a high-temperature.

Figure 5:
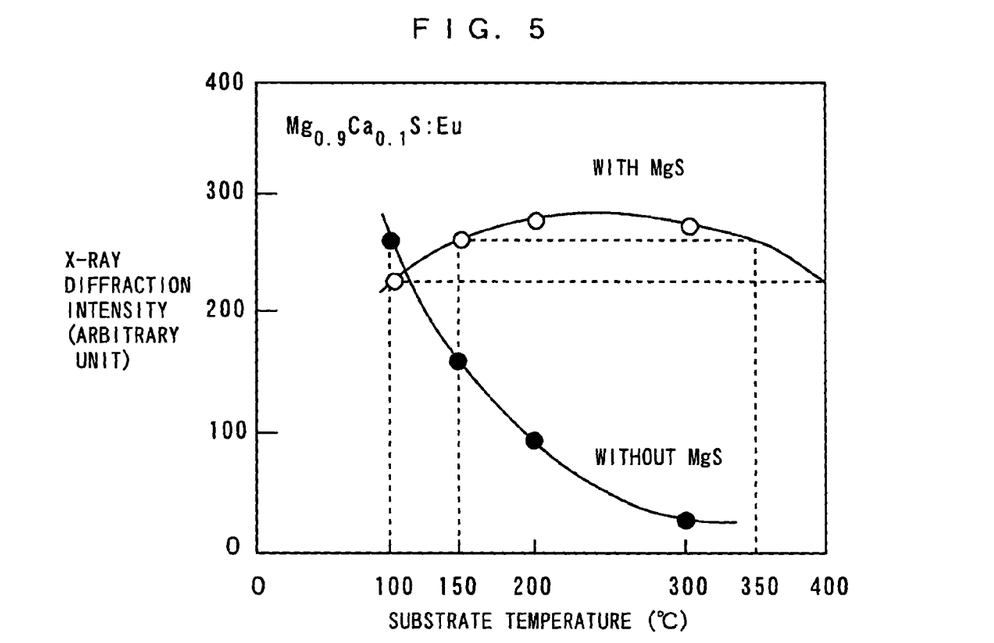
FIG. 5 is a diagram showing the result of measurement of the difference in the substrate temperature dependency of X-ray diffraction intensity of the $Mg_{0.9}Ca_{0.1}S$ film depending on presence/absence of the MgS film.

FIG. 5 is a diagram showing the result of measurement of the difference in the substrate temperature dependency of X-ray diffraction intensity of the $Mg_{0.9}Ca_{0.1}S$ film depending on presence/absence of the MgS film. FIG. 5 shows the intensity of diffraction peak derived from the (200) plane shown in FIGS. 3 and 4.

As shown in FIG. 5, without the MgS film, the intensity of X-ray diffraction of the $Mg_{0.9}Ca_{0.1}S$ film is decreased as the substrate temperature is decreased in the range of 100° C. to 300° C. In contract, with the MgS film, the intensity of X-ray diffraction of the $Mg_{0.9}Ca_{0.1}S$ film is increased with the substrate temperature in the range of 100° C. to 400° C.

The substrate temperature dependency of luminous intensity of a $Mg_{0.9}Ca_{0.1}S$ film was then measured depending on presence/absence of a MgS film. For the measurement, inorganic EL devices having the structure of FIG. 1 and inorganic EL devices having the same structure of FIG. 1 except that the underlayer 4 is not formed were employed.

Figure 6:
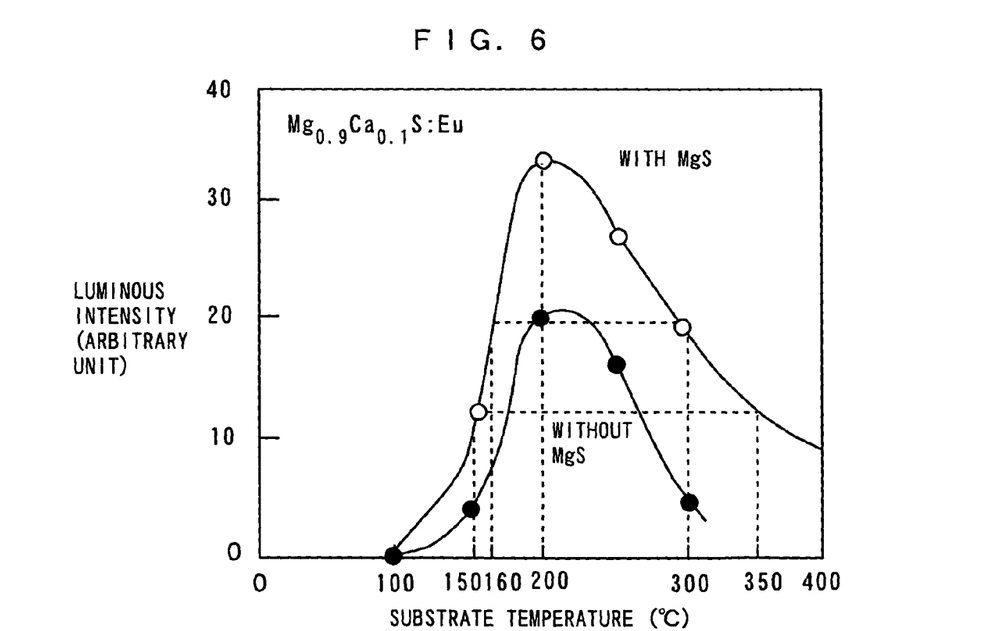
FIG. 6 is a diagram showing the result of measurement of the substrate temperature dependency of luminous intensity of a $Mg_{1-x}Ca_xS$ film depending on presence/absence of a MgS film.

FIG. 6 is a diagram showing the result of measurement of the substrate dependency of luminous intensity of a $Mg_{0.9}Ca_{0.1}S$ film depending on presence/absence of a MgS film.

As shown in FIG. 6, with and without the MgS film, the luminous intensity becomes higher with the substrate temperature higher than 100° C. In particular, the luminous intensity becomes high with the substrate temperature in the range of 150° C. to 350° C., and with the MgS film, the luminous intensity not less than a maximum value without the MgS film as an underlayer is obtained with the substrate temperature in the range of 160° C. to 300° C. and furthermore, the luminous intensity becomes highest at a substrate temperature of 200° C. In addition, when the substrate temperature is higher than 100° C., the luminous intensity becomes higher with the MgS film than when there is no MgS film.

It is found, therefore, that the optical characteristics of the $Mg_{0.9}Ca_{0.1}S$ film can be improved by forming the $Mg_{0.9}Ca_{0.1}S$ film on the MgS film, and setting the substrate temperature higher than 100° C.

The results of FIGS. 5 and 6 show that in fabricating the inorganic EL device of FIG. 1, it is preferable to set the substrate temperature higher than 100° C., more preferable in the range of 150° C. to 350° C., and even more preferable in the range of 160° C. to 300° C.

Figure 7:
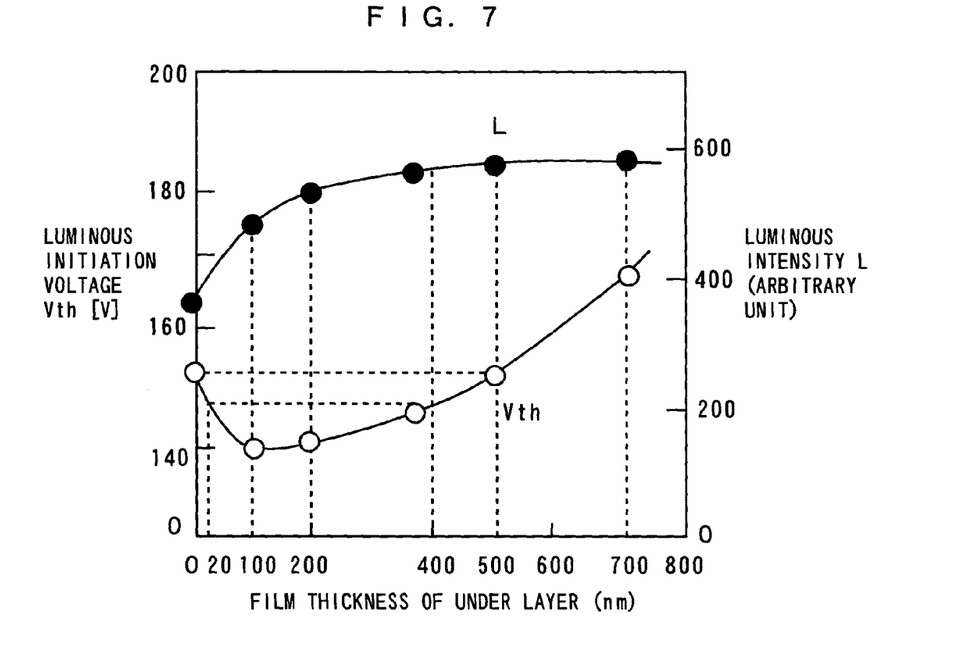
FIG. 7 is a diagram showing the result of measurement of the underlayer film thickness dependency of an emission initiation voltage and luminous intensity of the inorganic EL device of FIG. 1.

The inorganic EL devices of FIG. 1 having various thicknesees of underlayers 4 composed of MgS were then fabricated, and the underlayer thickness dependency of emission initiation voltage and luminous intensity was measured. FIG. 7 is a diagram showing the result of measurement of the underlayer thickness dependency of emission initiation voltage and luminous intensity in the organic EL device of FIG. 1.

As shown in FIG. 7, the luminous intensity L is increased as the thickness of the underlayer is increased, and it tends to be saturated with the thickness of the underlayer not smaller than 100 nm, and the luminous intensity L becomes saturated with the thickness of the underlayer not smaller than 500 nm.

In addition, the emission initiation voltage Vth becomes sufficiently low with the thickness of the underlayer 200 nm, and the emission initiation voltage Vth becomes lowest with the thickness of the underlayer 100 nm. The emission initiation voltage Vth is increased as the thickness of the underlayer is increased in the range of 100 nm to 700 nm.

Accordingly, in the inorganic EL device of FIG. 1, in order to lower the emission initiation voltage Vth, it is preferable that the thickness of the underlayer 4 composed of MgS is not larger than 500 nm, more preferable not larger than 400 nm, even more preferable not larger than 200 nm. Furthermore, it is preferable that the thickness of the underlayer 4 is not smaller than 100 nm in order to obtain a sufficiently high luminous intensity.

In order to obtain a sufficiently high luminous intensity while lowering the emission initiation voltage, it is preferable to set the thickness of the underlayer 4 in the range of 100 nm to 500 nm, more preferable in the range of 100 nm to 400 nm, and even more preferable in the range from 100 nm to 200 nm.

The Eu/Mg(concentration ratio) of the MgS powder or the $Mg_{0.9}Ca_{0.1}S$ films in FIGS. 2-7 above is 0.002.

Figure 8:
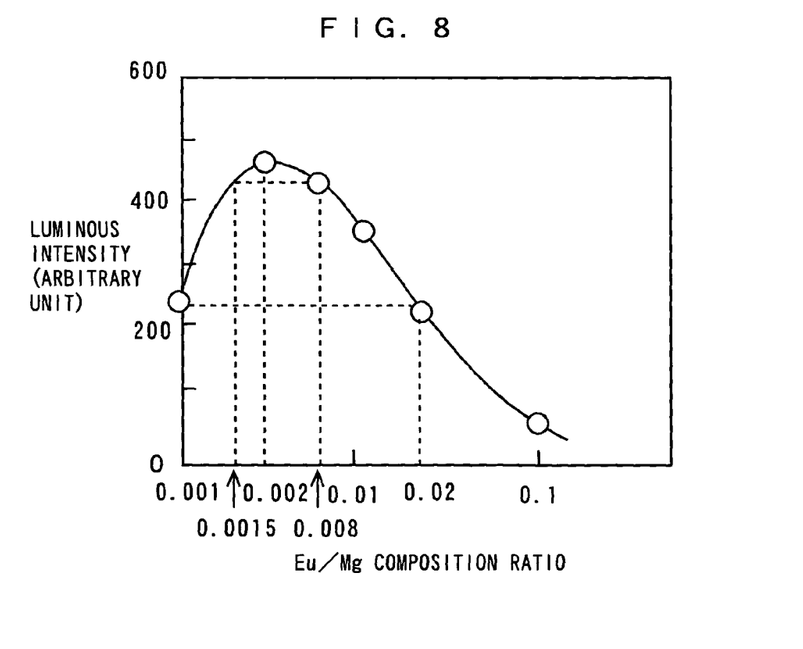
FIG. 8 is a diagram showing the result of measurement of the Eu/Mg composition ratio dependency of luminous intensity of the inorganic EL device of FIG. 1.

Inorganic EL devices each having the structure of FIG. 1 with varied amounts of doping of Eu were then fabricated, and the Eu/Mg composition ratio (concentration ratio) dependency of luminous intensity in the light emitting layer was measured. FIG. 8 is a diagram showing the result of measurement of the Eu/Mg composition ratio dependency of luminous intensity in the inorganic EL device of FIG. 1.

As shown in FIG. 8, the luminous intensity becomes high with the Eu/Mg composition ratio in the range of 0.001 to 0.02, and becomes highest when the Eu/Mg composition ratio is 0.002.

Since deterioration of the crystallinity of the $Mg_{1-x}Ca_xS$ film occurs due to doping of Eu when the Eu/Mg composition ratio becomes not smaller than 0.1, it is preferable that Eu/Mg composition ratio is larger than 0 and not larger than 0.1. In particular, from the result of FIG. 8, it is preferable that the Eu/Mg composition ratio is not smaller than 0.001 nor larger than 0.02, even more preferable not smaller than 0.0015 nor larger than 0.008.

Figure 9:
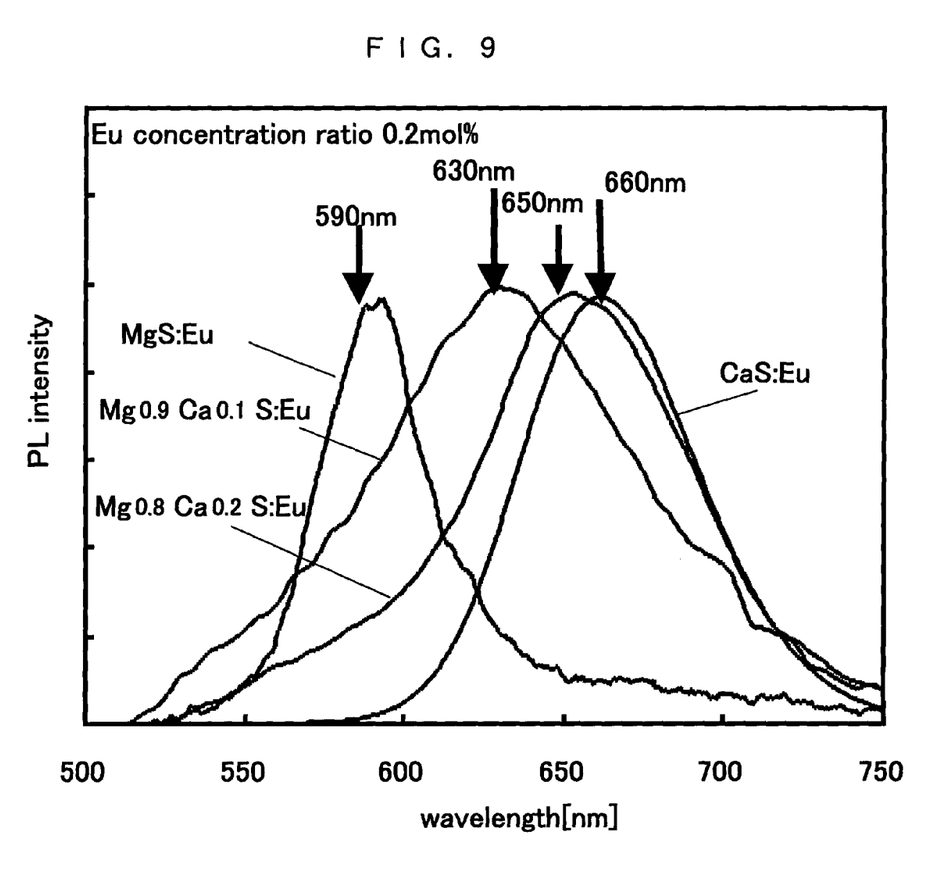
FIG. 9 is a diagram showing the result of measurement of the photoluminescent spectrum of $Mg_{1-x}Ca_xS$ films.

The Ca composition ratio x in the light emitting layer was varied at 0, 0.1, 0.2 and 1.0, and the photoluminescent(PL) spectrum of the $Mg_{1-x}Ca_xS$ films were subsequently measured, the Eu/Mg composition ratio was set to 0.002. FIG. 9 is a diagram showing the result of measurement of the photoluminescent(PL) spectrum of the $Mg_{1-x}Ca_xS$ films.

As shown in FIG. 9, it is seen that the peak wavelength is largely shifted to the long-wavelength such as 590 nm, 630 nm, 650 nm, and 660 nm as the Ca composition ratio x of the $Mg_{1-x}Ca_xS$ film is increased at 0, 0.1, 0.2 and 1.0. Accordingly, it becomes possible to vary the light emitting wavelength by adjusting the composition ratio x of Ca doped into the light emitting layer 5 composed of $Mg_{1-x}Ca_xS$.

Figure 10:
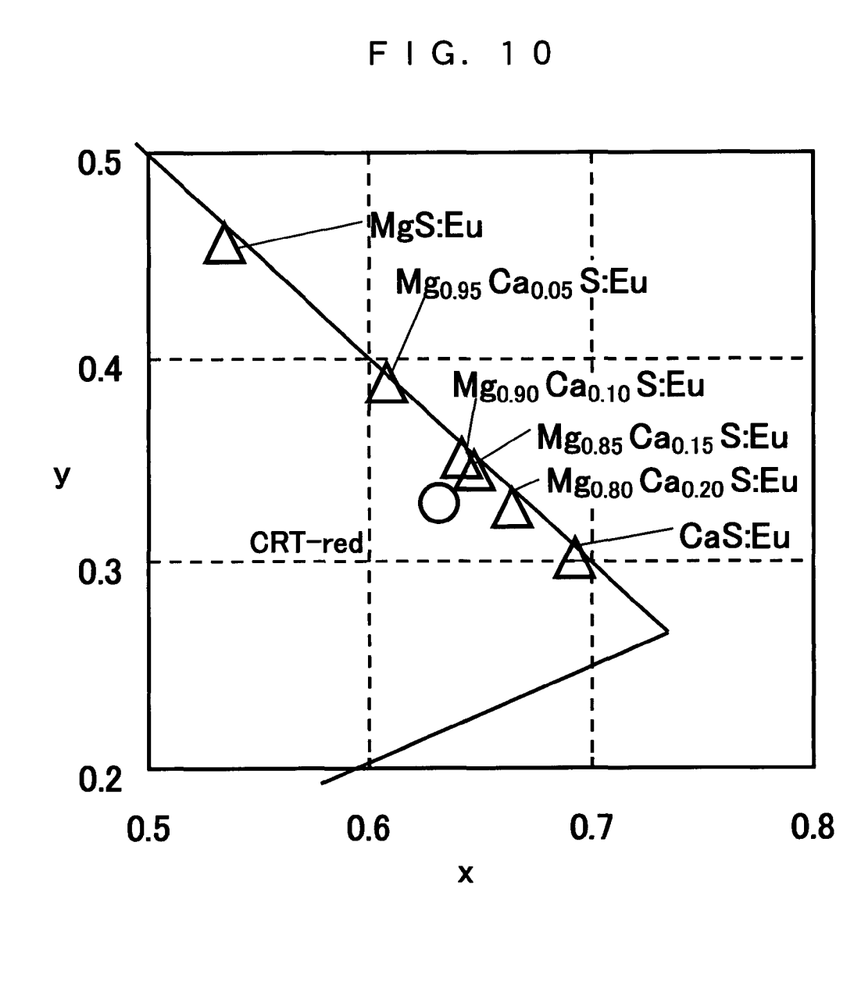
FIG. 10 is a chromaticity diagram of the luminous color of a $Mg_{1-x}Ca_xS$ film in the case where the Ca composition ratio x is varied from 0 to 1.0.

FIG. 10 is a chromaticity diagram of the luminescent color of the $Mg_{1-x}Ca_xS$ film when the Ca composition ratio x is varied from 0 to 1.0. The horizontal and vertical axes of FIG. 10 indicate x and y coordinates respectively in the CIE chromaticity diagram.

As shown in FIG. 10, the luminescent color changes from red-orange color to red color with an increase in the Ca composition ratio x of the $Mg_{1-x}Ca_xS$ film. Further, it is possible to obtain the red color purity corresponding to a CRT(cathode-ray tube) by doping Ca to satisfy the composition ratio x in the range of $0.1 \leq x \leq 0.15$.

While in the aforementioned embodiment Eu is doped into the light emitting layer 5 as a substance acting as a luminescent center, a rare earth element such as Ce(cerium) or a transition metal element such as Mn(manganese) may also be doped as an alternative substance acting as a luminescent center.

Furthermore, a rare earth element such as Eu or Ce or a transition metal element such as Mn(manganese) may also be doped into the underlayer 4 as a substance acting as a luminescent center. In this case, the underlayer 4 as well as the light emitting layer 5 is allowed to emit light.

Although in the aforementioned embodiment, the description has been made of the case in which the respective layers of the inorganic EL device are formed by sputtering, the invention is not limited to the method set out above, and it is also possible to form the respective layers of the inorganic EL device by other methods, such as vacuum vapor deposition or ion assisting vapor deposition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An inorganic electroluminescent device comprising in the following order:
    an underlayer formed of a first compound semiconductor of Group IIa-VIb, wherein said first compound semiconductor contains MgS; and
    a light emitting layer formed of a second compound semiconductor of Group IIa-VIb,
    wherein said first compound semiconductor and said second compound semiconductor have an orientation in the <100> direction, wherein said second compound semiconductor contains $Mg_{1-x}Ca_xS$, wherein x is $0.1 \leq x \leq 0.15$, and Eu is doped into $Mg_{1-x}Ca_xS$ as a substance acting as a luminescent center, and the composition ratio of Eu to Mg is not larger than 0.1.

2. The inorganic electroluminescent device according to claim 1, wherein the composition ratio of Eu to Mg is not larger than 0.01.

* * * * *

UNITED STATES PATENT AND TRADEMARK OFFICE
CERTIFICATE OF CORRECTION

PATENT NO. : 7,538,483 B2  Page 1 of 1
APPLICATION NO. : 10/635777
DATED : May 26, 2009
INVENTOR(S) : Akiyoshi Mikami It is certified that error appears in the above-identified patent and that said Letters Patent is hereby corrected as shown below:

On the title page of the Letters Patent, Item "(73) Assignee", after "Sanyo Electric Co., Ltd., Osaka (JP)", add the second Assignee name and address as follows:

--Akiyoshi Mikami, Kanazawa (JP)--.

Signed and Sealed this

Sixteenth Day of March, 2010

David J. Kappos
*Director of the United States Patent and Trademark Office*